V. W. PARKER.
TRANSMISSION GEARING CONTROL MECHANISM.
APPLICATION FILED FEB. 18, 1914.

1,216,599.

Patented Feb. 20, 1917.
6 SHEETS—SHEET 1.

Witnesses
Guy M. Spring
W. E. Valk Jr.

Inventor
Virgil W. Parker.

By
[signature]
Attorney

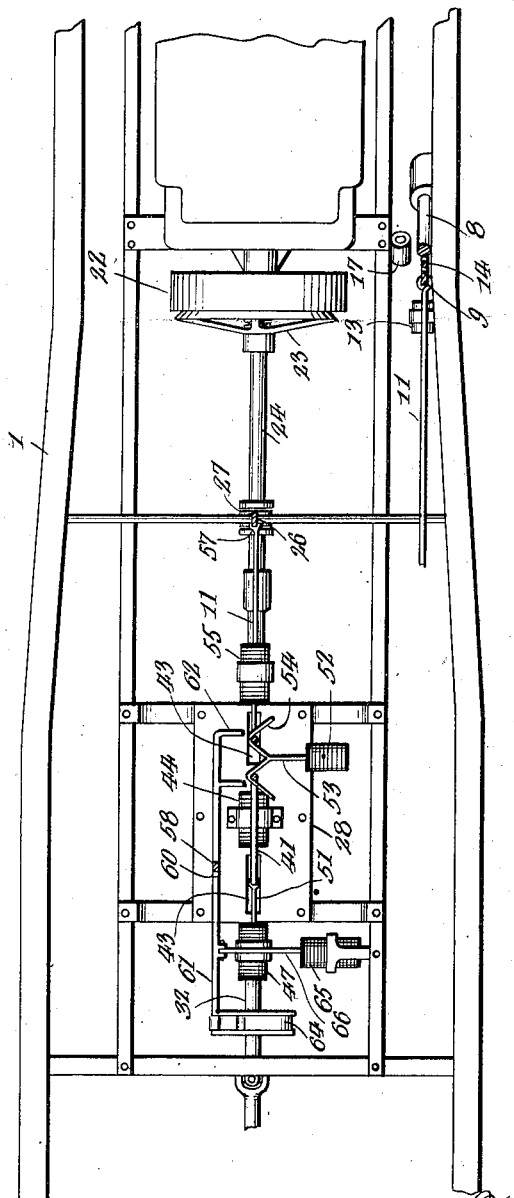

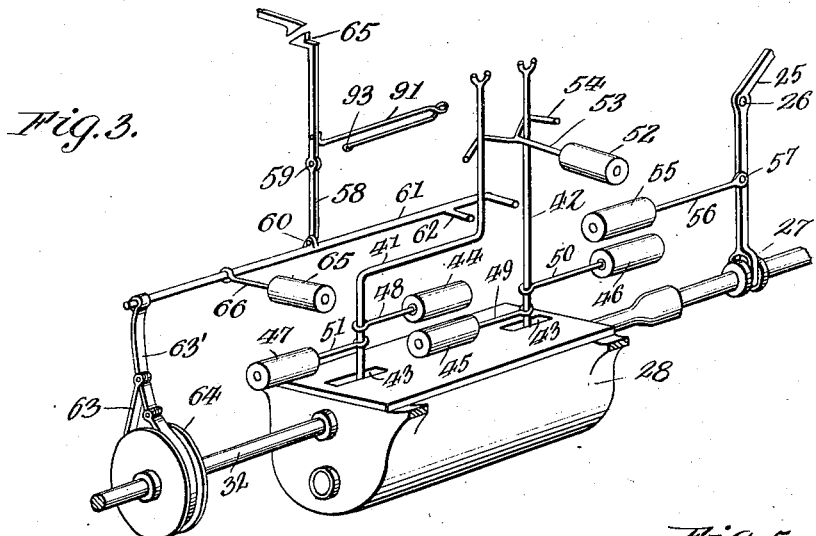
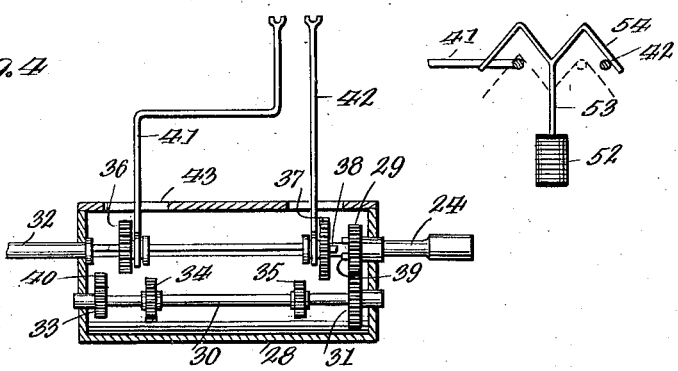
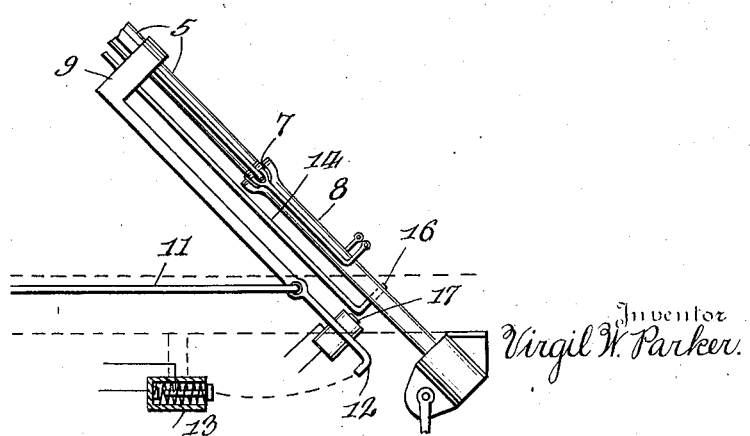

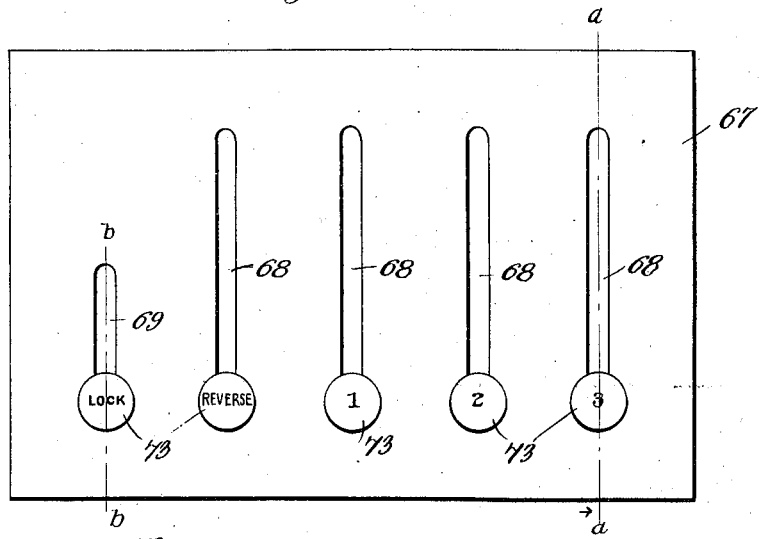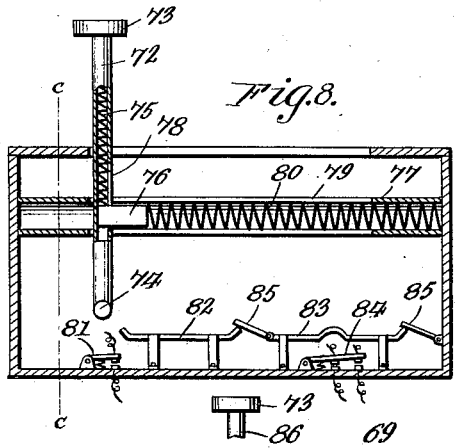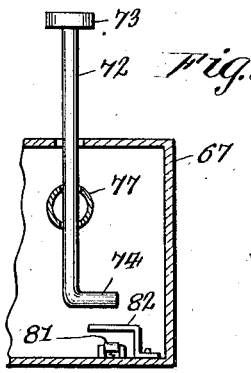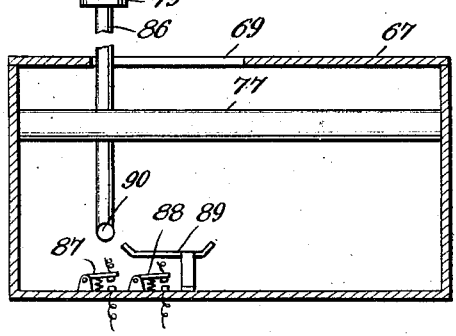

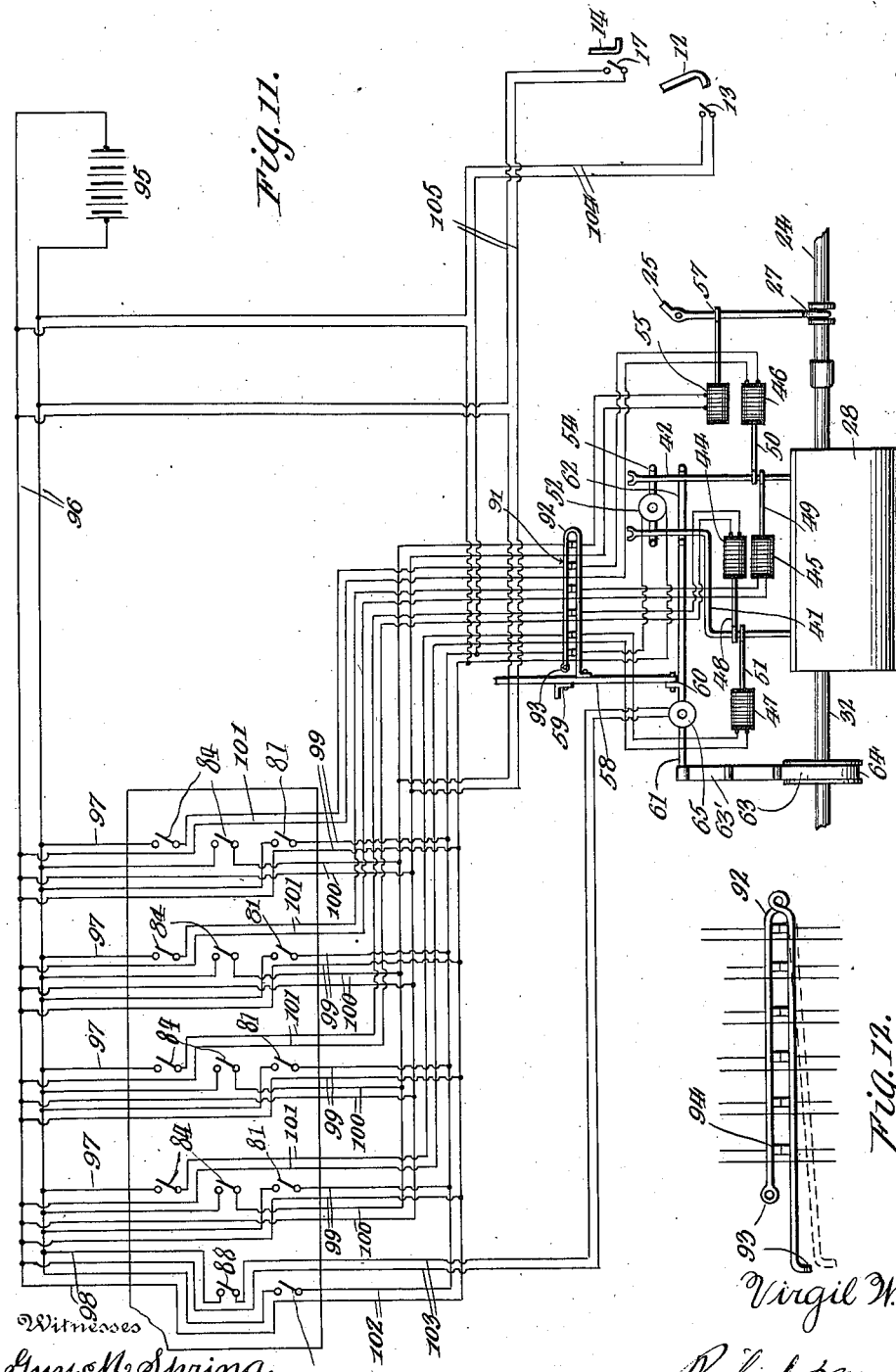

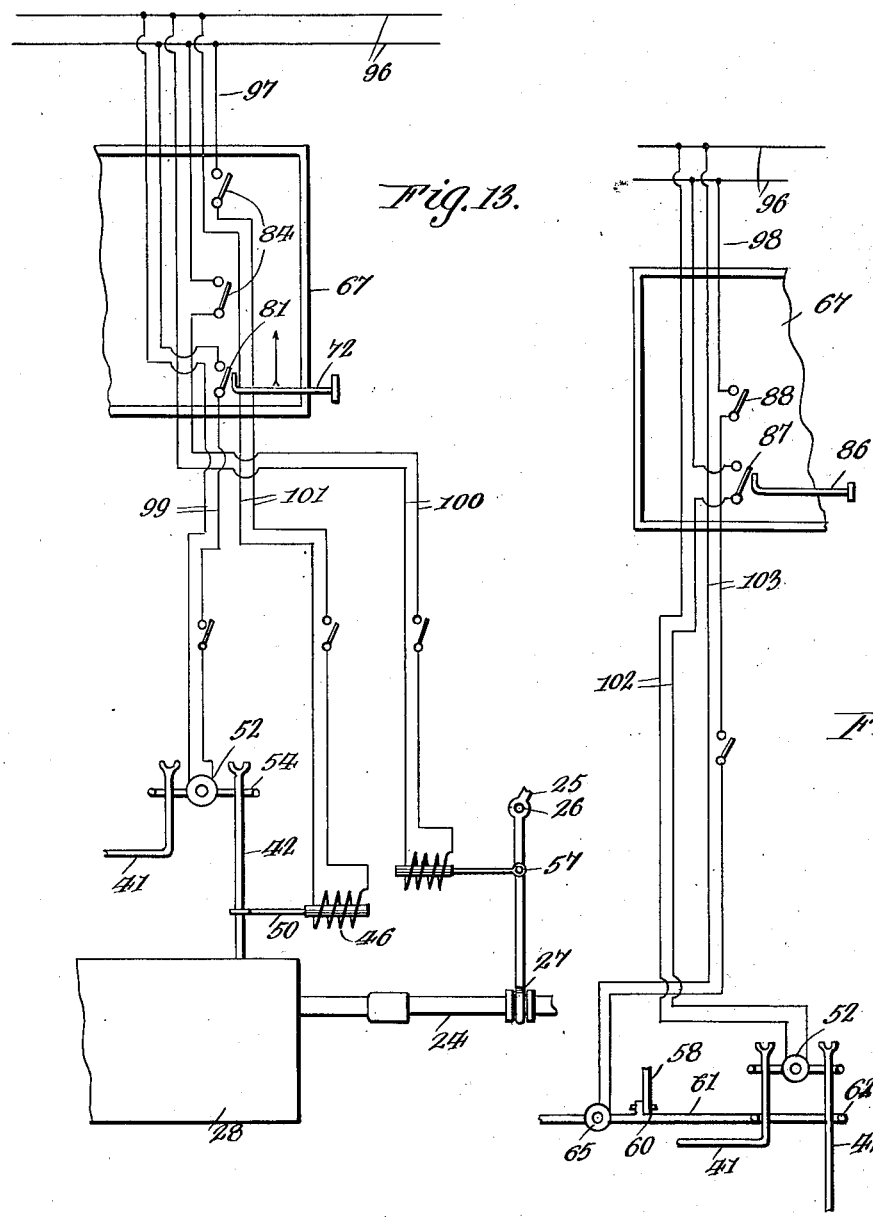

UNITED STATES PATENT OFFICE.

VIRGIL W. PARKER, OF LADDONIA, MISSOURI.

TRANSMISSION-GEARING-CONTROL MECHANISM.

1,216,599. Specification of Letters Patent. Patented Feb. 20, 1917.

Application filed February 18, 1914. Serial No. 819,506.

*To all whom it may concern:*

Be it known that I, VIRGIL W. PARKER, citizen of the United States, residing at Laddonia, in the county of Audrian and State of Missouri, have invented certain new and useful Improvements in Transmission-Gearing-Control Mechanism, of which the following is a specification.

This invention relates to electric control mechanism for the change speed gears or transmission of motor vehicles.

Objects of the invention are to provide means for quickly changing the gears of the speed mechanism with a rapid positive motion; to provide means whereby the clutch must be thrown out before any of the gears are shifted; to provide an electric mechanism for controlling the speed gears whereby change of speed can be made easily and rapidly and without requiring the operator to release the steering wheel; to provide electric mechanism for satisfactorily changing the gears and consequently the speed and direction of motion of the automobile or vehicle; and to provide for operating the speed gears to change the speed and direction of motion of an automobile by the simple manipulation of push buttons or the like arranged conveniently for operation by the driver or chauffeur.

A further object of the invention resides in the provision of means operatively connected to the steering post of the vehicle whereby bodily movement of said post will automatically and positively throw the speed gears into neutral, and at the same time automatically and positively apply the vehicle brakes.

The invention further contemplates means whereby, when not to be used, the drive shaft of the vehicle may be automatically and positively locked against rotation, which locking operation, will, slightly previous or in advance, shift the speed gears into neutral, and automatically break the several electric circuits necessary to actuation of said gears, thereby rendering a restarting or second operation of the machine impossible without first unlocking the said means.

The invention still further aims to provide an emergency means whereby the vehicle clutch may be electrically operated through manipulation of a suitable lever provided for convenient operation adjacent the steering wheel of the machine.

Finally, the invention aims to generally improve motor vehicle construction; to subject the speed gears or transmission of the machine to perfect control; and to eliminate to a great extent accidents now occurring through inability of the driver or chauffeur to either entirely stop or quickly increase or diminish the running speed of the car.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Fig. 2 is a top plan view, the body of the vehicle being removed to better illustrate the arrangement of the mechanism comprising the present invention;

Fig. 3 is a detail perspective view illustrating the mechanism or means employed for shifting the speed gears as well as the means for locking the said gears against movement when it is desired that such a locking operation should be effected;

Fig. 4 is a longitudinal sectional view of the gear box illustrating the arrangement of the speed gears therein;

Fig. 5 is a top plan view of the means employed for shifting the gears into neutral;

Fig. 6 is an enlarged side elevation of a portion of the steering post illustrating the manner in which either the neutral operating or the clutch operating circuit may be closed;

Fig. 7 is a top plan view of a switch box;

Fig. 8 is a section on the line *a—a* of Fig. 7;

Fig. 9 is a section on the line *c—c* of Fig. 8;

Fig. 10 is a section on the line *b—b* of Fig. 7.

Fig. 11 is a diagrammatic view illustrating the electric system employed for operating the several mechanisms comprising the present invention;

Fig. 12 is a detail top plan view of the automatically operated circuit breaker comprising a part of the electric system;

Fig. 13 is an enlarged diagrammatic view of a portion of the electric system illustrating the several circuits opened and closed through actuation of one of the push bottons or speed controlled keys; and Fig. 14 is a diagrammatic view of a portion of an electric circuit illustrating in detail the several circuits effected through manipulation of a lock operating push button or key.

Figure 1:
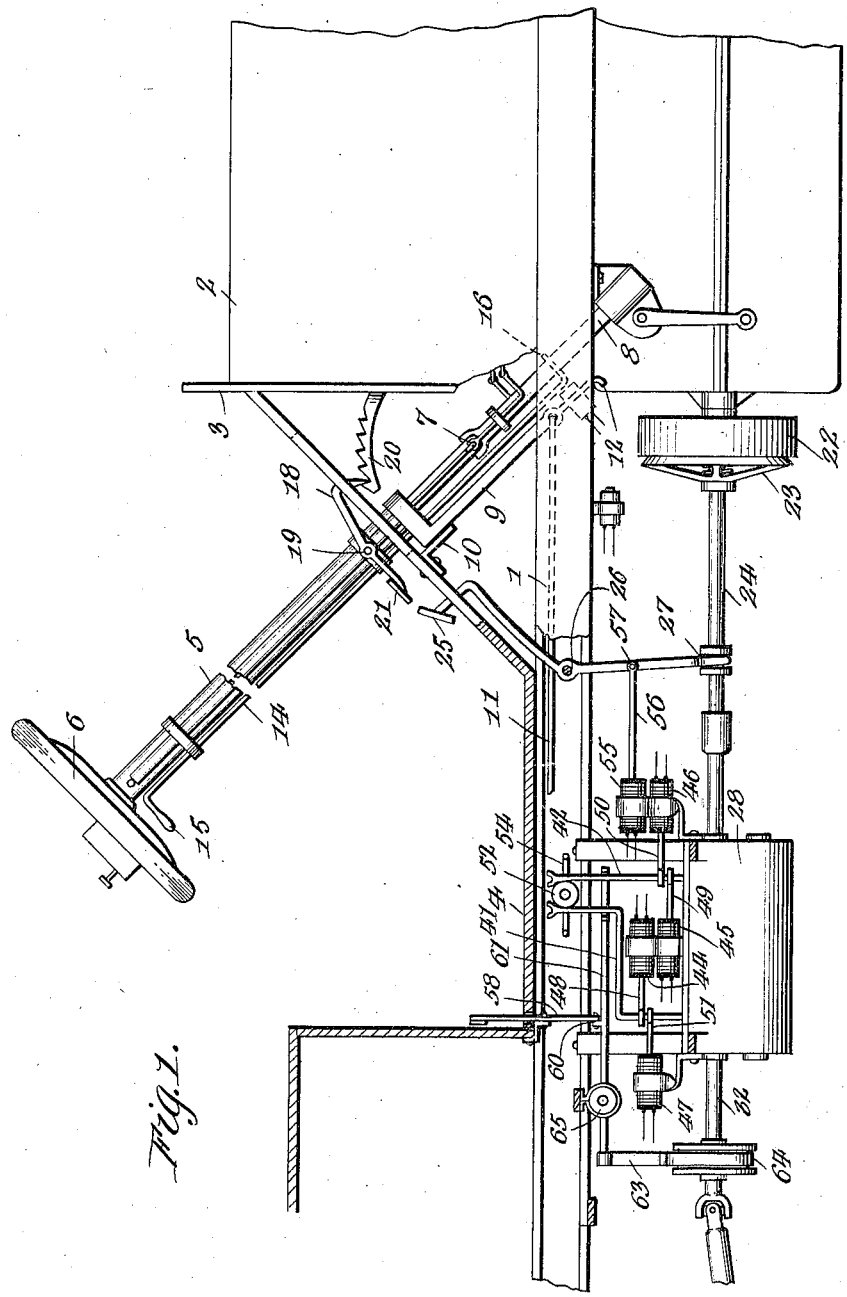
Figure 1 is a side elevation, illustrating the application of the present invention to a motor vehicle of ordinary construction.

Before proceeding with the description of the drawings, I desire to call particular attention to the fact that while I have evolved my invention with reference to its application in connection with motor vehicles of various types, the same may be readily utilized as a speed control device for various other forms and types of machines.

Referring now to the drawings by numerals, 1 designates the chassis, 2 the hood, 3 the dash board and 4 a portion of the body of an ordinary motor vehicle, automobile or machine. Extending normally at an angle to the dash board 3 is the usual steering post 5 of the machine upon the top of which a steering wheel 6 is mounted. The said steering post 5 is universally joined as at 7 to the lower section 8 thereof and, as the said lower section is supported immovable, it is apparent that the upper section 5 may be bodily moved in the arc of a circle from the point 7 for a purpose to be hereinafter fully described. Connected to the steering post 5 at a point above the universal joint 7 and beneath the dash board 3 is an angle bracket 9, normally disposed for engagement with a stop bracket 10 carried by the board 3, the latter serving as a support whereby the steering post and the wheel are normally maintained at the desired angle relative to the body 4 of the machine. The free end of the bracket 9 has loosely secured thereto in any suitable manner, a brake operating rod 11, movement of which is controlled through bodily movement of the steering post section 5. The said bracket 9 is also provided at its lower extremity with a contact member 12 movable into and out of engagement with a spring actuated switch plug 13 disposed beneath the chassis 1 and in the path of movement of the said contact to provide for the make and break of an electric circuit to be hereinafter described.

Operatively connected to the steering post 5 and extending in parallel relation thereto is an auxiliary clutch operating rod 14, one end of which terminates in a handle 15 at a point adjacent the steering wheel 6. The opposite end of the said rod terminates in an angular extension 16 normally positioned to swing bodily with the steering post section 5 into engaging relation with a second spring actuated switch plug 17 conveniently positioned upon the chassis 1. By imparting to the rod 14 a quarter turn through manipulation of the handle 15, the extension 16 is moved to contact with the plug 17 and, as the said plug is adapted to close an electric circuit operatively connected with the clutch operating mechanism (to be subsequently described,) it is apparent that in cases of emergency, the said clutch may be actuated without necessitating that the chauffeur or driver of the machine remove his hand from the steering wheel 6 of the car.

As a means whereby the steering post section 5 may be automatically locked in raised position or in a substantially vertical plane, I provide a pawl 18 fulcrumed as at 19 to the steering post section 5 and adapted for engagement with a segment 20 disposed in the path thereof and beneath the dash board 3. To release the pawl 18 from the segment 20 to provide for the return of the steering post 5 to its normal angular position, a foot pedal 21 is provided, which pedal is integral with and secured to an extension of the said pawl.

Proceeding now with the description of the transmission control, 22 designates the fly wheel of the engine and 23 the cone-shaped clutch usually associated therewith. As usual, the clutch 23 is mounted upon and rotatable with the change speed gearing shaft 24, the latter being longitudinally movable, to disengage the clutch 23 from the fly wheel 22, through actuation of a foot pedal 25 pivoted as at 26 and loosely connected as at 27 to the said shaft. The opposite end of the change speed gearing shaft extends into the gear box 28 and has rotatably mounted thereupon a gear 29, through rotation of which motion is imparted to the counter-shaft 30, the latter having a gear 31 at all times meshing with the said gear 29. One end of the drive shaft 32 of the machine extends into the gear box 28 and is journaled in a recess therefor of the shaft 24. Mounted upon the counter-shaft 30 are a plurality of speed changing gears 33, 34 and 35, decreasing in size from the former to the latter. Mounted for longitudinal sliding movement upon but rotatable with the drive shaft 32 are gears 36 and 37, also varying in size, 36 being the smaller of the two. The gear 37 is provided with a lateral clutch extension 38, which extension is adapted for co-mesh with a like extension 39 of the gear 29 aforesaid. By shifting or sliding the gear 37 until the said extensions 38 and 39 co-mesh, it is apparent that the shaft 32 will be driven at the same rate of speed as the change speed gearing shaft 24, this being the highest speed attainable. A reverse movement of the gear 37 until in mesh with the gear 35 of the counter-shaft 30 will provide for second speed. A movement of the gear 36 in one direction or until in mesh with the gear 34 will provide for first or low speed, while a reverse movement of the said gear 36 until in mesh with an idler 40 in turn meshing with the gear 33 will provide for a reverse rotation of the drive shaft 32. It is to effect quick, automatic and positive actuation of the gears 36 and 37 that the mechanism comprising the present invention is designed. Operating arms 41 and 42 respectively embrace the hub of the gear wheels 36 and 37, the said arms extending exteriorly of the gear box 28 through slots 43 formed therein, one of the said arms, 41 being bent or angularly extended intermediate its ends to terminate at a point in close proximity with the arm 42 as illustrated to advantage in Fig. 4 of the drawings.

Supported in any suitable manner beneath the chassis 1 of the machine and above the gear box 28 thereof are a plurality of solenoids designated respectively, 44, 45, 46 and 47, the poles 48, 49, 50 and 51 of which are operatively connected with the respective arms 41 and 42 to provide for a shifting or sliding movement thereof.

Another solenoid 52 is suitably mounted in a plane above the solenoids previously referred to, the pole 53 of the said last mentioned solenoid being branched at its free extremity as indicated at 54, each branch or extension being substantially V-shaped, to provide, when actuated by the solenoid 52 for the forced movement of the arms 41 and 42, regardless of their position, into neutral. As indicated in Fig. 5 of the drawings, it is apparent that the arms when neutral, engage the extensions 54 at their converged or pointed portions and, when shifted, either to the right or left, engage either of the diverged portions, this arrangement, as is apparent upon application to the said Fig. 5, causing the said arms to be moved into neutral position whenever the pole 53 and the solenoid 52 is actuated.

As the clutch 23 is also electrically operated, another solenoid 55 is provided, the pole 56 of which is pivoted as at 57 to the pedal 25, which arrangement, when the said pole is attracted will withdraw the clutch 23 from engagement with the wheel 22 in the desired manner.
Passing to the locking mechanism comprising a part of the present invention, 58 designates a lock operating lever fulcrumed as at 59 intermediate its ends and pivoted as at 60 at one end to a locking arm 61, the latter terminating at one end in a pair of parallel spaced extensions 62 disposed, when actuated, one upon each side of the arms 41 and 42 and in close proximity thereto to render movement of the said arms away from each other impossible. The opposite end of the member 61 is operatively connected by means of a lever 63', with the brake band 63 of a brake drum 64 mounted upon the drive shaft 32 of the machine, this arrangement, as is apparent upon application to Fig. 3, causing the said band to be tightly drawn into frictional engagement with the said drum to thereby retard rotation of the shaft. Any suitable lock mechanism designated 65 may be provided to automatically lock the lever 58 in set position. Normally, the extensions 62 of the member 61 are without engagement with the arms 41 and 42 and are so positioned as to in no way interfere with movement thereof, yet should the solenoid 65 provided for actuating the member 61 be energized, the pole 66 thereof will bodily move the said member until the extensions 62 inclose the said arms and set the band 63 in a braking position.
The operating mechanism for controlling operation of the several solenoids above referred to is conveniently positioned in a suitable case 67 provided therefor upon the steering wheel 6 of the machine. In the present instance, the top of the case 67 is provided with a plurality (five in number) of slots 68 arranged in parallel relation, one of the slots 69 being about half as long as the other four. The key or operating mechanism for making or breaking the several electric circuits being the same, but one of the said mechanisms will be described in detail, the same comprising a key member, designated as an entirety by the numeral 72 movable vertically within one of the slots 68, the said member being provided at one end with an indicating button 73, and at its opposite end with a right angled extension 74. The said key 72 being tubular in form, it is apparent that a spring 75 may be inclosed therein to normally maintain the said key in an elevated position. One end of the spring 75 abuts the button 73, and the opposite end a vertically immovable but longitudinally slidable block 76 one end of which extends into the said key 72 and the opposite end into a second tubular member 77 extending in a direction transverse to the key 72. To permit vertical movement of the key independent of the said block 76, the former is slotted as at 78 within which the said block works. The tubular member 77 being within the casing 67 and longitudinally slotted as at 79, it is further apparent that the key 72 may be bodily moved throughout the length of the said slot, it however, upon being released, automatically returning to its normal position indicated in Fig. 8 by means of an expansion helical spring 80 inclosed within the member 77 and abutting respectively the block 76 and one of the end walls of the casing. The said spring 80 also serves as a means whereby the block 76 is at all times held with its one end inclosed by the key 72.

Directly beneath the key member 72 and within the casing 67 is disposed a pivoted spring actuated contact or switch device 81, which, when depressed by engagement of the extension 74 therewith, closes the electric circuit for energizing the solenoid 52 to shift the speed gears into neutral. The key 72 having been depressed, until the neutral operating circuit is closed, bodily longitudinal movement of the said key against tension of the spring 80 will cause the extension 74 to pass beneath a retaining plate 82 and, by continued bodily longitudinal movement, beneath a second plate 83. Beneath the latter plate, the extension 74 is adapted for engagement with a second spring actuated contact or switch device designated 84, the actuation of which will close the electric circuit operating the vehicle clutch, and at the same time (there being two contacts) close the electric circuit for shifting the speed gears into first, second, third or reverse, this being determinable by the key acted upon. At the far end of the member 83 and between the said members 82 and 83 are provided hinged flaps 85 to permit, by the tension of the spring 75 a return of the key 72 to its normal position.

The arrangement and construction of the lock operating switch key 86 is substantially the same as the key 72, the said key 86 however being first engageable with a spring actuated pivoted contact 87 to close the neutral circuit and later for engagement with a second spring actuated pivoted contact 88 to close the lock operating circuit, a retaining element 89 being provided to maintain the extension 90 of the key 86 in engagement with the contact 88 if so desired.

Movement of the operating lever 58 not only provides for a locking of the arms 41 and 42 but also provides for the actuation of a circuit breaker designated as an entirety by the numeral 91. The said circuit breaker in its preferred embodiment comprises a substantially U-shaped resilient member 92 one end of which is secured as at 93 to the lever 58, and the opposite end of which is immovable with respect to the chassis or body of the car. A plurality of contact members 94 are disposed upon the adjacent edges of the extension of the said member 92 which contacts are normally in engagement to thereby, when the lock key 86 is inoperative, close the several electric circuits necessary to operation of the device. When actuated, the lever 58 in moving upon its fulcrum point 59 disengages the several contacts 94 to automatically break the several electric circuits, thus rendering the entire electrical system inoperative as long as the said lever 58 remains locked by the mechanism designated 65. The said mechanism 65 is of a construction whereby to render unauthorized operation of the machine impossible. In Figs. 11, 13 and 14, the arrangement of the electric wires or conductors necessary to complete the electrical system is shown. In Fig. 11, 95 designates a battery, although a magneto may equally as well be used, to which the feed wires 96 run. Conductors 97 connect the said feed wires with the switch devices 81 and 84 above referred to, while conductors 98 connect the said feed wires with the switch devices 87 and 88. From the switch devices 81 and 84, conductors designated respectively 99, 100 and 101 convey the current to the respective solenoids provided for shifting the speed gears in the manner above set forth. Similar conductors 102 and 103 connect the switch devices 87 and 88 respectively with the solenoids 65 and 52, all of the said conductors, except 103, being breakable by actuation of the circuit breaker 91. Suitable conductors 104 connect the switch plug 13 with the battery 95 and with the neutral conductors 99, while suitable conductors 105 connect the switch plug 17 with the clutch operating circuit conductors 100.

Operation of the mechanism comprising the present invention is as follows:

When it is desired that a motor vehicle be started, the said vehicle being provided with the elements above noted, the crank shaft of the engine is set in motion in the usual manner for driving the fly wheel 22 thereof. The switch key indicating first speed is then pressed until the extension 74 thereof engages the switch device 81. An electric circuit is then made through battery 95, wires 96, conductors 97, conductors 99 and solenoid 52, the energizing of the latter of which moves the arms 41 and 42 into neutral. Continued movement of the key 72 until in engagement with the switch device 84 will first close the circuit formed by battery 95, wires 96, conductor 97, conductors 100 and solenoid 55, the energizing of which will withdraw clutch member 23 from engagement with the fly wheel 22. The clutch member 23 being withdrawn, the circuit formed by battery 95, wires 96, conductors 97, conductors 101 and solenoid 44 is closed, the energizing of the latter causing the pole member 48 to shift gear 36 into mesh with gear 34 to thereby provide for forward movement of the machine at low speed. Second and third speed are effected in a similar manner through manipulation of the switch keys provided for closing the electric circuit necessary to energizing the solenoids 45 and 46, it being apparent however, that the gears are first shifted into neutral and the clutch withdrawn before the circuit for operating the said solenoids is closed. To bring the machine to a stand still, the vehicle brakes are applied, and the lock operating switch key 86 manipulated to first shift the gears into neutral and subsequently lock said gears against subsequent shifting by the disposition of the extensions 62 with respect to the arms 41 and 42 aforesaid. Neutral shift of the gears, as above stated, is made possible through the manipulation of the key 86, this actuation being effected through circuits formed by battery 95, wires 96, conductors 98, conductors 102 and solenoid 52. Continued movement of the key 86 until in engagement with the switch device 88 will close circuit formed by the battery 95, wires 96, conductors 98, conductors 103 and solenoid 65, the energizing of which will actuate member 61 to in turn set brake 64 and lock arms 41 and 42 in the manner aforesaid. Movement of said member 61 through lever 58 will also provide for actuation of circuit breaker 91 and automatic locking of said lever by mechanism 65, thereby rendering a reuse or restarting of the vehicle impossible without first unlocking said mechanism by a suitable key or other device provided therefor.

In emergency cases, the machine may be brought to a stand still by forward bodily movement of steering post 5, such movement closing circuit formed by switch 13, battery 95, conductors 104 and solenoid 52, the energizing of the latter of which will throw speed changing gears into neutral, while bodily movement of post 5 will automatically apply the vehicle brakes through actuation of brake rod 11. Actuation of rod 14 will close circuit formed by switch 17, battery 95, conductors 105 and solenoid 55, the energizing of the latter of which will operate clutch member 23 to disengage same from fly wheel 22 of the engine.

From the above, taken in connection with the accompanying drawings it is apparent that the speed control of the entire machine is effected through manipulation of key 72; that an automatic locking is effected through manipulation of key 86; and that the labor attendant upon the driving of a motor vehicle as at present constructed is materially diminished while transmission is subjected to perfect control.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. The combination with the speed gear changing mechanism and the clutch mechanism for motor vehicles, of a plurality of speed gear shifters, an electromagnetic device for controlling the shifters to position them at neutral, electromagnetic devices for controlling the shifters to position them for changing speed, electromagnetic devices for controlling operation of the clutch mechanism, circuits including a source of current and operatively connected with the respective magnetic devices, and switch devices having a plurality of contacts for closing the circuit appertaining to the neutral position of one shifter before closing the circuit appertaining to the speed change position of the other, as and for the purpose set forth.

2. In speed gear changing mechanism for motor vehicles, the combination with the speed changing gears, and clutch mechanism for controlling the operation of the said gears, of a plurality of speed gear shifters, a plurality of electromagnetic devices, and electric circuits within which the electromagnetic devices are arranged, the said devices being connected to the shifters and to the clutch mechanism to operate when the circuits are closed, first the shifters to position the speed gears at neutral, next the clutch mechanism, and finally the shifters to change speed.

3. In a motor vehicle, the combination with the clutch mechanism, the speed gear changing mechanism, and a brake mechanism for the speed gear shaft, of a plurality of electromagnetic devices, speed gear shifters, said electromagnetic devices being actuatable to control the brake mechanism, movement of the speed gear shifters, and the clutch mechanism, a plurality of electrical circuits within which the electromagnetic devices appertaining to the speed gear shifters and the clutch mechanism are arranged, a circuit within which the electromagnetic device appertaining to the brake mechanism is arranged, a switch device operable to close respectively the circuit appertaining to the electromagnetic device for shifting the speed gears into neutral, the circuit appertaining to the electromagnetic device for actuating the clutch mechanism, and finally the electromagnetic device appertaining the means for shifting the gears to change speed, and a switch device actuatable first to shift the speed gears into neutral and second to actuate the brake mechanism, as and for the purpose set forth.

4. In a motor vehicle, the combination with the speed gear change mechanism, gear shifters, and brake mechanism to control rotation of the speed gear shaft, of an electromagnetic device, a bodily movable arm having connection with said brake mechanism and said electromagnetic device, and circuits including a source of current and a switch device, the switch device being operable to close the circuit appertaining to the neutral position of the shifters before closing the circuit appertaining to the operation of the brake mechanism, as and for the purpose set forth.

5. In a motor vehicle, the combination with the speed gear changing mechanism, the speed gear shifters, and the clutch mechanism, of a plurality of electromagnetic devices, circuits including a source of current and operatively connected with the respective electromagnetic devices, and switch devices operable to close the circuit appertaining to the neutral position of the shifters before closing the circuit appertaining to the actuation of the clutch, and to close the circuit appertaining to the actuation of the clutch before closing the circuit appertaining to speed change position of the shifters.

6. In a motor vehicle, the combination with the speed gear changing mechanism, the speed gear shifters, and the brake mechanism for the speed gear shaft, of a bodily movable operating element, an electromagnetic device for controlling movement of said element, a connection between said element and the brake mechanism, electromagnetic devices operable to shift the speed gears into neutral, means on said element to lock the shifters in neutral, and means including suitable circuits operatively connected with the respective electromagnetic devices, each circuit having arranged therein switch devices operable to close the circuit appertaining to the neutral position of shifters before closing the circuit appertaining to the actuation of the said element, as and for the purpose set forth.

7. In a motor vehicle, the combination with the speed gear changing mechanism, of a plurality of speed gear shifters, electromagnetic devices operable to actuate the shifters, electrical circuits within which the respective electromagnetic devices are arranged, means operable to make and break the several circuits, and means operated by one of said electromagnetic devices engaging the respective shifters to position the speed gears at neutral, and means operable to lock the said shifters at neutral and to break the several electric circuits simultaneously.

8. In a motor vehicle, the combination, of speed gear changing mechanism, a brake device therefor, clutch mechanism, means to shift the speed gears, means to actuate the clutch, means to actuate the brake device, an electrical circuit including a source of current, and a switch device within said circuit, said switch device being operable to provide for sequential actuation of the various means.

9. Speed gear change mechanism for motor vehicles comprising speed gear shifters, electro-magnetic devices operable to actuate the shifters, means including two substantially V-shaped members movable to shift the gears into neutral, and means to actuate said V-shaped members.

10. In combination, speed gear change mechanism for motor vehicles, comprising a speed gear shaft, brake mechanism therefor, means to move the gears into neutral, and means operating simultaneously with the actuation of the brake mechanism to lock the gears at neutral.

11. In combination, speed gear change mechanism for motor vehicles, comprising a speed gear shaft, brake mechanism, a plurality of electrical circuits, means within the various circuits to actuate the shifters and the brake mechanism, and means operable through movement of the brake mechanism to break the various circuits and lock the speed gears in neutral for the purpose set forth.

In testimony whereof I affix my signature in presence of two witnesses.

VIRGIL W. PARKER.

Witnesses:
J. S. McCune,
W. C. Torreyson.